(12) United States Patent
Loheide et al.

(10) Patent No.: US 8,100,235 B2
(45) Date of Patent: Jan. 24, 2012

(54) CONTROLLABLE HYDRAULIC BEARING

(75) Inventors: Stefan Loheide, Wallenhorst (DE);
Hubert Siemer, Dinklage (DE);
Burkhard Meyer, Dinklage (DE); Josef Burwinkel, Dinklage (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 639 days.

(21) Appl. No.: 12/188,275

(22) Filed: Aug. 8, 2008

(65) Prior Publication Data
US 2009/0057968 A1 Mar. 5, 2009

(30) Foreign Application Priority Data
Aug. 27, 2007 (DE) .......................... 10 2007 040 600

(51) Int. Cl.
*F16F 9/53* (2006.01)

(52) U.S. Cl. .................................. 188/267.2; 267/140.3

(58) Field of Classification Search .................. 188/267, 188/267.1, 267.2, 269; 267/140.14, 140.15, 267/219, 35, 141.2, 140.3, 140.4, 141, 140.11
See application file for complete search history.

(56) References Cited

U.S. PATENT DOCUMENTS

| | | | |
|---|---|---|---|
| 4,909,489 A * | 3/1990 | Doi | 267/140.12 |
| 5,398,917 A * | 3/1995 | Carlson et al. | 267/140.14 |
| 6,722,480 B2 | 4/2004 | Carlson | |
| 2002/0130000 A1 | 9/2002 | Lisenker et al. | |
| 2002/0153647 A1 | 10/2002 | Baudendistel et al. | |

FOREIGN PATENT DOCUMENTS

| | | |
|---|---|---|
| DE | 3910447 A1 | 10/1989 |
| DE | 10336094 A1 | 3/2005 |
| EP | 0427413 A1 | 5/1991 |
| EP | 0965006 B1 | 12/1999 |
| EP | 1016806 B1 | 7/2000 |
| FR | 2883616 A1 | 9/2006 |

* cited by examiner

*Primary Examiner* — Melanie Torres Williams
(74) *Attorney, Agent, or Firm* — Norris McLaughlin & Marcus, PA; Christa Hildebrand, Esq.

(57) ABSTRACT

A controllable hydraulic bearing for damping vibrations in a defined frequency band is proposed, which includes an elastomeric body (1), two chambers which are filled with a magneto-rheological fluid and connected with one another by at least one channel (2), with the chambers having at least partially flexible chamber walls, wherein the buckling spring rate of the chamber walls represents a measure for a pressure change due to the volume displacement between the chambers, and at least one electromagnet which generates a magnetic field in the region of the channel (2). According to the invention, the magnetic field in the region of the channel (2) is an inhomogeneous magnetic field.

Figure 1:
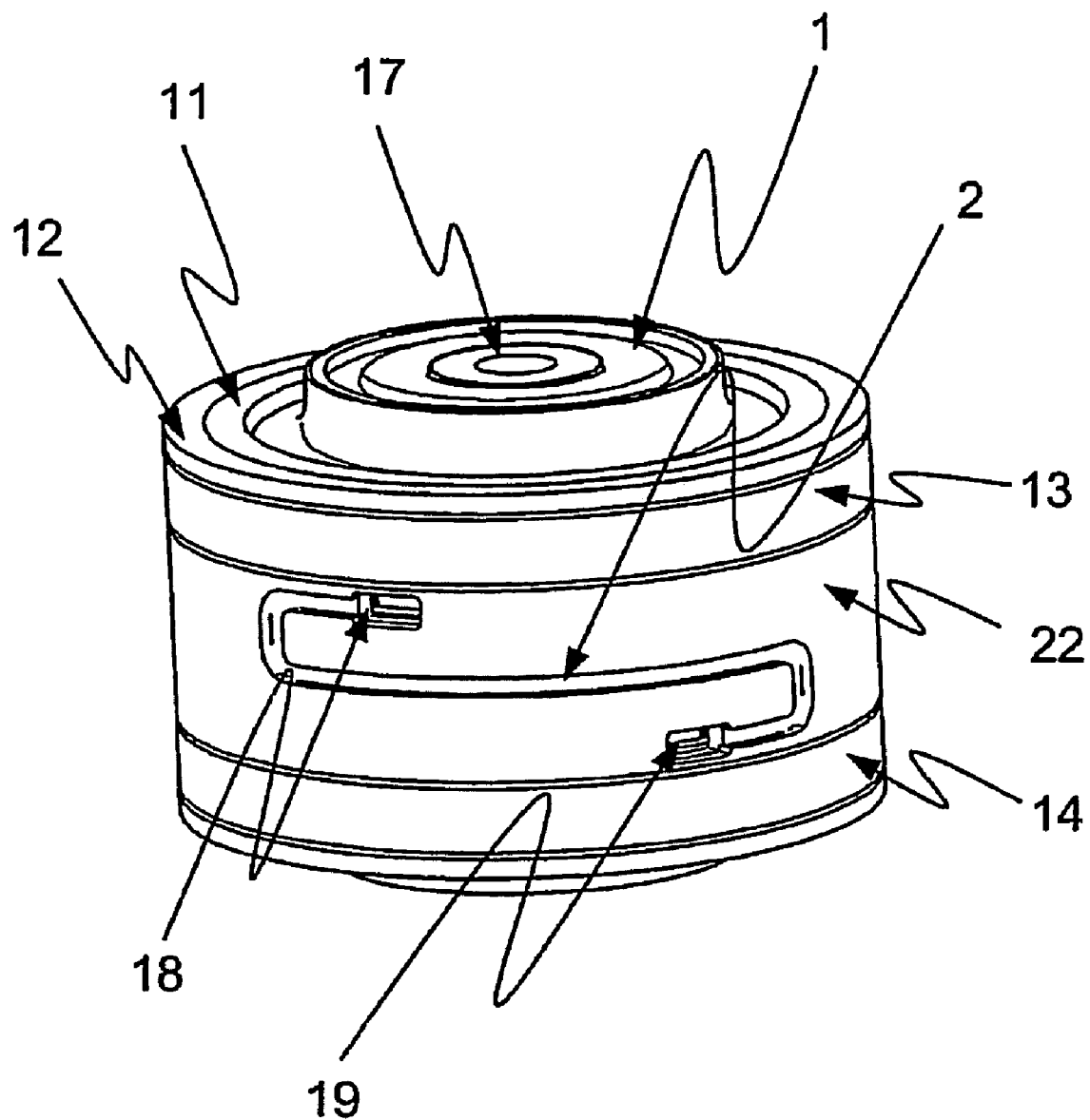

18 Claims, 8 Drawing Sheets

CONTROLLABLE HYDRAULIC BEARING

BACKGROUND OF THE INVENTION (1) Field of the Invention

The invention relates to a controllable hydraulic bearing for damping vibrations in a defined frequency band. The bearing includes an elastomeric body, two chambers filled with a magneto-rheological fluid and connected by at least one channel, the two chambers having at least partially flexible chamber walls, wherein the chamber walls have a buckling spring rate representing a measure for a pressure change due to the volume displacement between the chambers, and at least one electromagnet generating a magnetic field in the region of the channel.

(2) Description of Related Art

Controllable hydraulic bearings in different configurations are used in motor vehicles, for example, as hydraulic supports for damping the chassis or the engine, predominantly for damping vibrations in a defined frequency band. Hydraulic bearings or hydraulic bushings include an elastomeric body capable of supporting static preloads. Conventional hydraulic bushings include at least two chambers filled with a fluid. The chambers are connected by a fluid-conducting channel which also has vibration-damping properties. When the hydraulic bearing is subjected to an external force, the volume of one of the chambers decreases to the same degree as the volume in the other chamber increases, with fluid being exchanged through the channel, as mentioned above. In addition, flexible chamber walls can accommodate a change in volume. The chamber walls hereby resist deformation, causing a change in pressure in the chambers. A measure for the pressure change due to volume displacement is referred to as buckling spring rate. The connecting channel equalizes the pressure between the chambers during spring deflection of the hydraulic bushing at low frequencies. Only the elastomeric body is used here as spring support and for damping the support body. An oscillating damped system which consists of the elastic chamber walls and the mass of the fluid residing in the channel becomes increasingly important with increasing frequency. Damping is here produced by the internal friction of the fluid in the channel and/or by its inertia. The damping and hence also the elastic properties change significantly when the hydraulic bearing is excited near a resonance frequency. Above the resonance frequency, the inertia of the mass of fluid in the channel and the friction components prevent additional pressure equalization between the chambers. In this case, the relative stiffness of the chamber walls supports the rigidity of the support and causes an increase in the overall stiffness compared to a low-frequency load. The width, height and position of the resonance can be defined within certain limits by, for example, the flexibility of the flexible chamber walls and by the viscosity of the employed hydraulic fluid. Empirical values for these parameters are known.

Also known are hydraulic bearings which include, in addition to the aforedescribed channel, an additional channel or several channels between the chambers. These additional channels are typically shorter and wider than the main channel and cause an increase in the resonance frequency. The stiffness of the hydraulic bearing is reduced through addition of the at least one additional channel. The driving comfort of motor vehicles equipped with such hydraulic bearings can be significantly improved with these measures. The additional channel must be closed in order to meet the dynamical requirements of the vehicle movements, especially for large load changes, such as acceleration, braking or driving through turns.

It is also known to provide controllable hydraulic bearings with rheological fluids. Such rheological fluids typically change their viscosity and hence their flow characteristics in an applied electric field—for an electro-rheological fluid—or in an applied magnetic field—for a magneto-rheological fluid. When using rheological fluids, the fluidic behavior and therefore the damping characteristic of the hydraulic bearings can be continuously changed and hence also controlled, so that hydraulic bearings of this type are in this context referred to as controllable hydraulic bearings. Controllable hydraulic bearings which permit adaptive control are known, for example, from EP 0 965 006 B1, EP 1 016 806 B1 or EP 0 427 413 A1. A controllable hydraulic bearing based on an electro-rheological fluid is also disclosed in DE 39 10 447 A1. Pulse-width-modulation is here employed which requires rather complex electronics. The use of electro-rheological fluids, however, has its limits where large pressure differences must be supported across relatively large distances between the electrodes.

The inventors have realized that that conventional controllable hydraulic bearings using magneto-rheological fluids disadvantageously operate always with homogeneous magnetic fields. It has been observed that when a pressure limit in the hydraulic bearing is exceeded, the channel which was previously closed by the magneto-rheological fluid, suddenly and abruptly opens. This can result in unwanted noise inside the hydraulic bearing, which is unacceptable in particular when a hydraulic bushing is used to support the chassis of a motor vehicles. It has also been observed that this phenomenon is caused by the homogeneous magnetic field used in conventional hydraulic bushings to date. One possible explanation for this observation may be that the magnetizable particles in the magneto-rheological fluid strongly accumulate at a certain location and then suddenly detach from the walls of the channel when the aforementioned pressure limit is exceeded. This causes the channel to open and allows the fluid to flow from one chamber into the other.

The change in the length of the channel between the chambers, as implemented in several conventional hydraulic bearings, is also disadvantageous for switching processes. In most cases, the channel length which controls the frequencies to be damped inside the hydraulic bearing is altered by employing mechanical solutions. These are relatively sluggish and hence not suited for all applications.

BRIEF SUMMARY OF THE INVENTION

It is an object of the invention to provide a controllable hydraulic bearing with a simple structure for damping vibrations in a defined frequency band by using a magneto-rheological fluid, which allows the damping characteristics to be altered by intentionally and controllably changing the properties of the magneto-rheological fluid in the channel region, wherein the channel connecting the chambers may even be completely closed off.

The invention attains the object with the features of claim 1. Additional embodiments are recited in the dependent claims.

A controllable hydraulic bearing for damping vibrations in a defined frequency band includes an elastomeric body, two chambers filled with a magneto-rheological fluid and connected by at least one channel, wherein the chambers have at least partially flexible chamber walls and a buckling spring rate which represents a measure for a pressure change resulting from the volume displacement between the chambers, and at least one electromagnet which generates a magnetic field in the region of the channel. The controllable hydraulic bearing was modified by the invention in that the magnetic field in the region of the channel is an inhomogeneous magnetic field.

Based on their expertise in the field of conventional controllable hydraulic bearings that use magneto-rheological fluids, the inventors arrived at a solution with an inhomogeneous magnetic field, thereby avoiding the disadvantages of homogeneous magnetic fields, where the channel that is closed by the magneto-rheological fluid abruptly opens when a limit pressure is exceeded. The invention provides a controllable hydraulic bearing which enables the fluidic properties of the magneto-rheological fluid to change gradually and thus increase or decrease controllably, so that the bearing characteristic can be flexibly adapted. Bothersome noise is no longer observable. A passive embodiment of a hydraulic bearing is provided. The stiffness of the hydraulic bearing of the invention can be switched, allowing a significant number of variations. In addition, the damping characteristic of the hydraulic bearing can also be controlled, in particular depending on the excitation amplitude. The solution of the invention has a comparably simple structure and is conceptually different from variants that are based on changes in the channel length. The present invention instead controls the channel cross-section by changing the properties of the magneto-rheological fluid to thereby affect the flow and overall stiffness of the hydraulic bearing. Other solutions according to the invention modify only a portion of a channel with an inhomogeneous magnetic field, whereas other solutions affect the entire length of the channel.

For generating and intentionally controlling the inhomogeneous magnetic field, the invention provides channel geometries with a characteristic structure. The accompanying inhomogeneous spreading of the magnetic field lines inside the magneto-rheological fluid in the channel causes a predeterminable and very uniform change of the properties of the magneto-rheological fluid. Accordingly, in a first embodiment of the invention, the channel has at least in certain sections inclined sidewalls and/or a paraboloidal or spheroidal cross-section.

With this channel structure, an inhomogeneous magnetic field can be controllably generated at least in key sections of the channel of the hydraulic bushing. The magnetic field lines have the characteristic property that they exit perpendicular to the surface that guides the magnetic field. Taking this effect into consideration, the inhomogeneous magnetic field of the channel can be readily attained and its properties controllably affected by suitably shaping the channel geometry.

Because the invention follows an entirely novel approach by changing the cross-section of the channel, the channel cross-section can advantageously be changed by controlling the current and thereby the generated magnetic field. Different damping characteristics for different amplitudes can be generated by controlling the current through the coils as well as by selecting the channel cross-sections. Magnetic fields can be generated through selection of suitable values for the current, which affect the magnitude and frequency range of the damping when fluid flows through the channel, depending on the pressure difference or a measured acceleration signal, or by way of the channel geometry. Advantageously, this effect can be controlled by controlling the current flow through the coil of the electromagnet, wherein the chamber pressure(s) or the acceleration is/are used as control signal. An acceleration signal can be used to calculate the frequency of the resulting amplitude for a known frequency, for example, by employing electronic processing units (CPU) or microcontrollers. The acceleration signal can be readily measured outside the hydraulic bushing, for example in the component that receives the hydraulic bushing. A large amplitude generates a high chamber pressure and hence causes a high current in the coils, which in turn narrows the channel and also lowers the resonance frequency. The cross-section of the channel geometry can change until the channel is completely closed.

According to a particularly advantageous variant of the solution, the current can be controlled as a function of the pressure difference of the chamber pressures measured in the hydraulic bearing. Accordingly, the pressure is measured with suitable sensors in at least one chamber of the hydraulic bearing or in a region of the channel, with the measured signal representing a control signal for the current to be set. The controllable hydraulic bearing can thereby react to changing situations almost in real time. If the hydraulic bearing is installed in a motor vehicle, the damping provided by the hydraulic bearing can, for example in conjunction with a central processing unit (CPU) or a suitable microcontroller, be part of an active chassis tuning mechanism. The measured data can be further processed in the central processing unit and also forwarded to other components, thereby providing a complete system with electronic control.

For example, if the amplitude is determined from the aforedescribed values, then the values representing the resonance frequency can be predicted based on known ranges of these values. The hydraulic bearing according to the invention can be adapted, i.e., matched, to this information by controlling the current to change the channel cross-section and therefore also the damping.

According to another embodiment of the invention, defined regions having a magnetic field concentration are present in the channel. For example, if the channel inside the hydraulic bearing has a substantial length, then the channel may have different regions with different magnetic field strengths, so that the properties of the flow passing through the channel can be controllably changed.

For example, the magnetic field concentration within the channel can be influenced by placing magnetic insulators in the marginal region of a channel and/or in the channel, or by the aforedescribed channel geometry. The magnetic field lines cannot extend through the insulators, and instead propagate around the insulators. This is based on the effect that the magnetic field lines always propagate along a path of least resistance. Controllably affecting and spreading the magnetic field lines can also produce an inhomogeneous magnetic field.

According to another embodiment of the invention, the hydraulic bearing includes at least one sleeve with the channel disposed therein. By locating the channel in the sleeve, the component can be readily manufactured as a separate part and integrated in the elastomeric body of the hydraulic bearing.

In addition, the hydraulic bearing can have several sleeves, wherein the individual sleeves are preferably placed inside one another in form of a sandwich structure. This produces a "multilayer structure." The multilayer structure of the interposed sleeves allows a more differentiated control of the channel(s). Magnetic saturation can be prevented by proper selection of the current direction, because the fields cancel each other.

In an advantageous embodiment of this solution, several sleeves may be arranged concentrically with respect to one another. For example, the channel can be arranged on the outside of a respective inner sleeve. This keeps the manufacturing costs of the sleeves relatively low. The channel can also extend across several sleeves to attain a substantial length of the channel between the chambers of the hydraulic bearing. This arrangement also affects the properties of the hydraulic bearing of the invention in a controllable manner.

As already mentioned before, a hydraulic bearing may have several channels instead of only a single channel. For example, each individual channel can be part of a channel system. To attain a channel with the aforedescribed length, the channel can advantageously have a curved path along the outer surface of at least one of the sleeves.

In a modification of the invention, at least one sleeve may receive in its outer surface a coil or coil pairs of the electromagnet. Advantageously, at least one sleeve may be made of soft-magnetic iron so as to provide a return path for the magnetic field through the sleeve. With this structure, the corresponding sleeve itself can operate as an electromagnet, which advantageously simplifies the structure of the hydraulic bearing considerably. An additional, separate electromagnet is then no longer required and is instead integrated in the sleeve. Advantageously, the field lines of the inhomogeneous magnetic field can thereby be optimally guided inside the hydraulic bearing.

According to an advantageous embodiment of the hydraulic bearing of the invention, the controllable hydraulic bearing can be a bush bearing for motor vehicles, which can be used, for example, in the wheel suspension in motor vehicles.

The invention will now be described in more detail with reference to the appended figures, which describe in more detail certain exemplary embodiments of the invention. The illustrations do not restrict the invention to the depicted variants. Instead, the figures are used only for explaining the principle of the invention. Identical or equivalent details or components are always indicated with the same reference numerals. For illustrating the functionality according to the invention, the figures only show very simplified schematic diagrams, omitting those elements which are not essential for the invention. However, that does not mean that such elements are not part of the solution according to the invention.

BRIEF DESCRIPTION OF THE SEVERAL VIEWS OF THE DRAWING(S)

Figure 2:
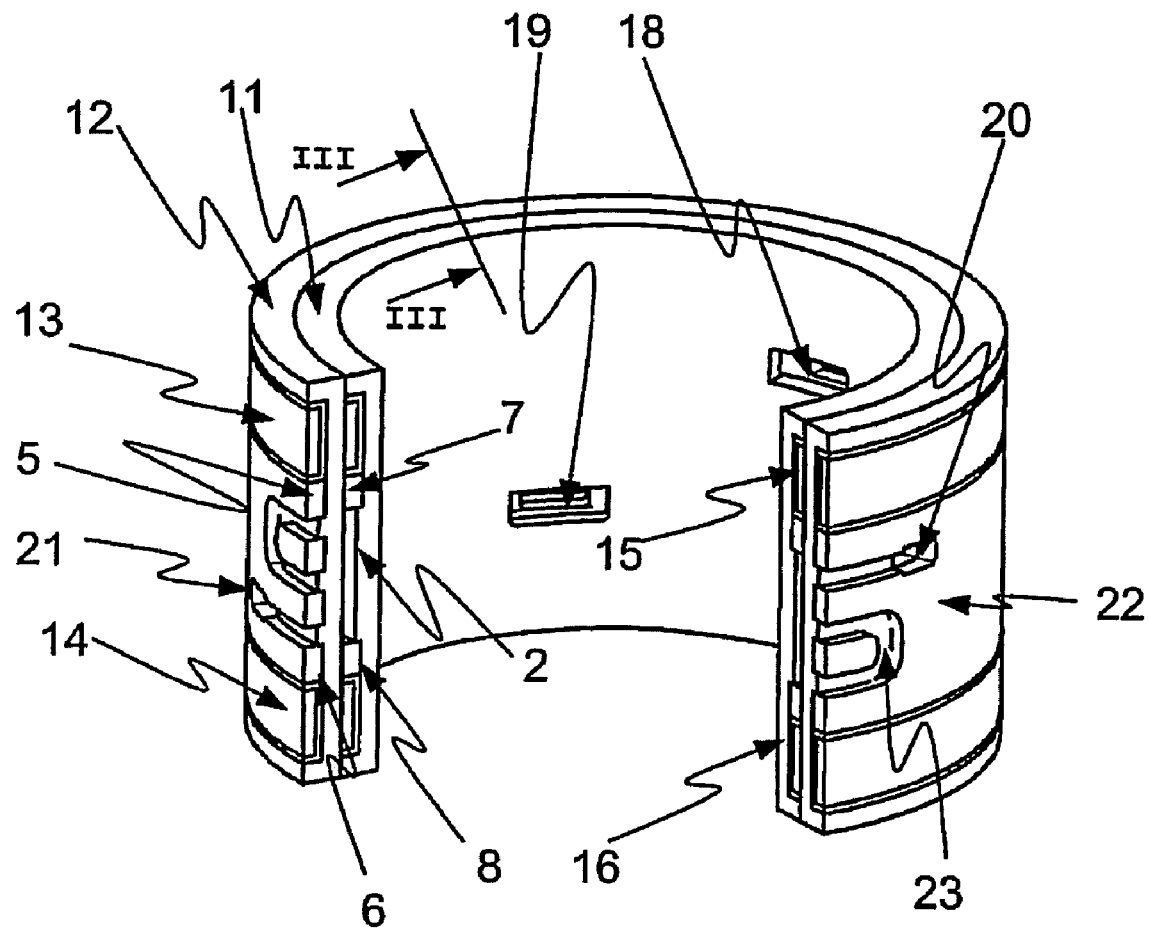
Figure 3:
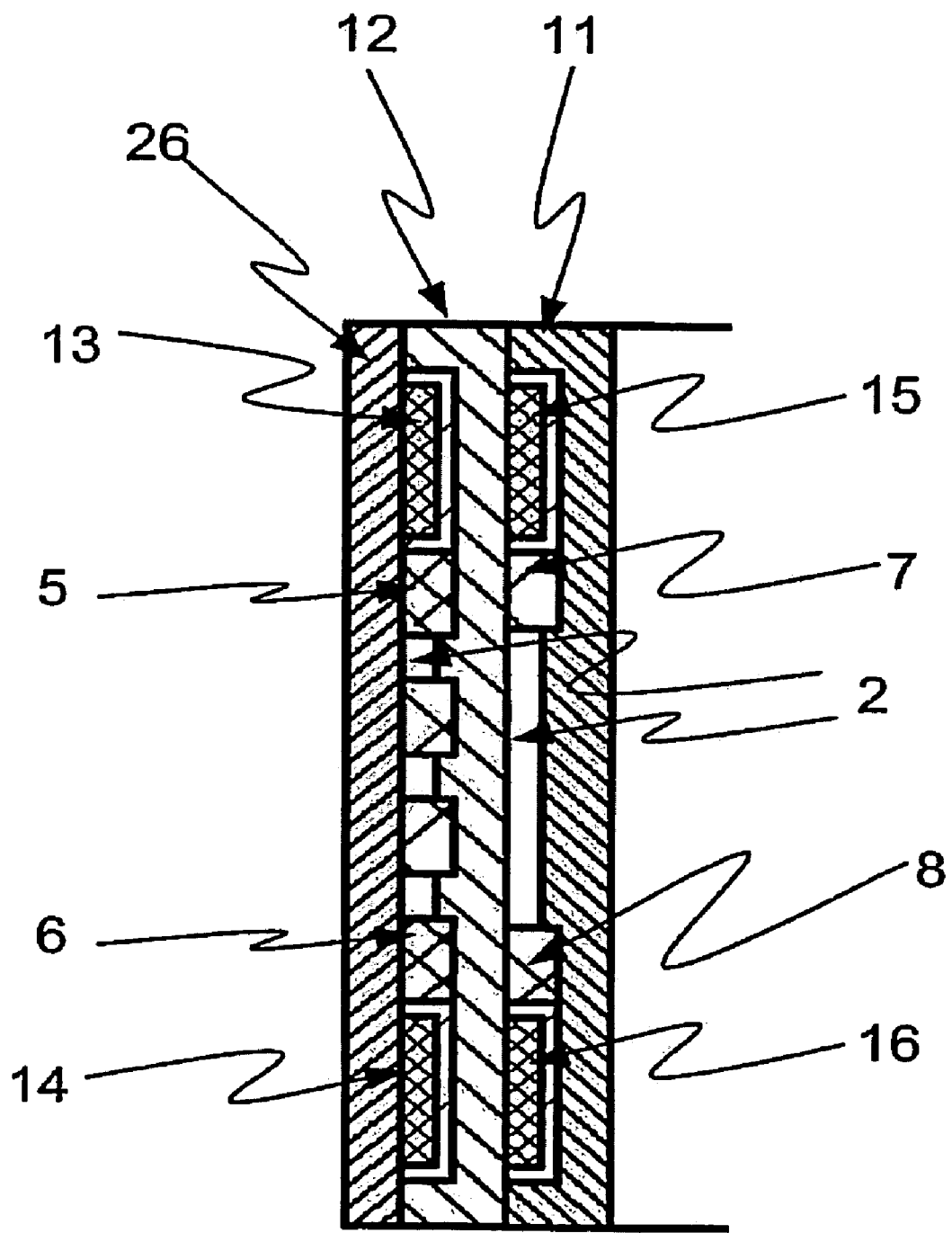
Figure 4:
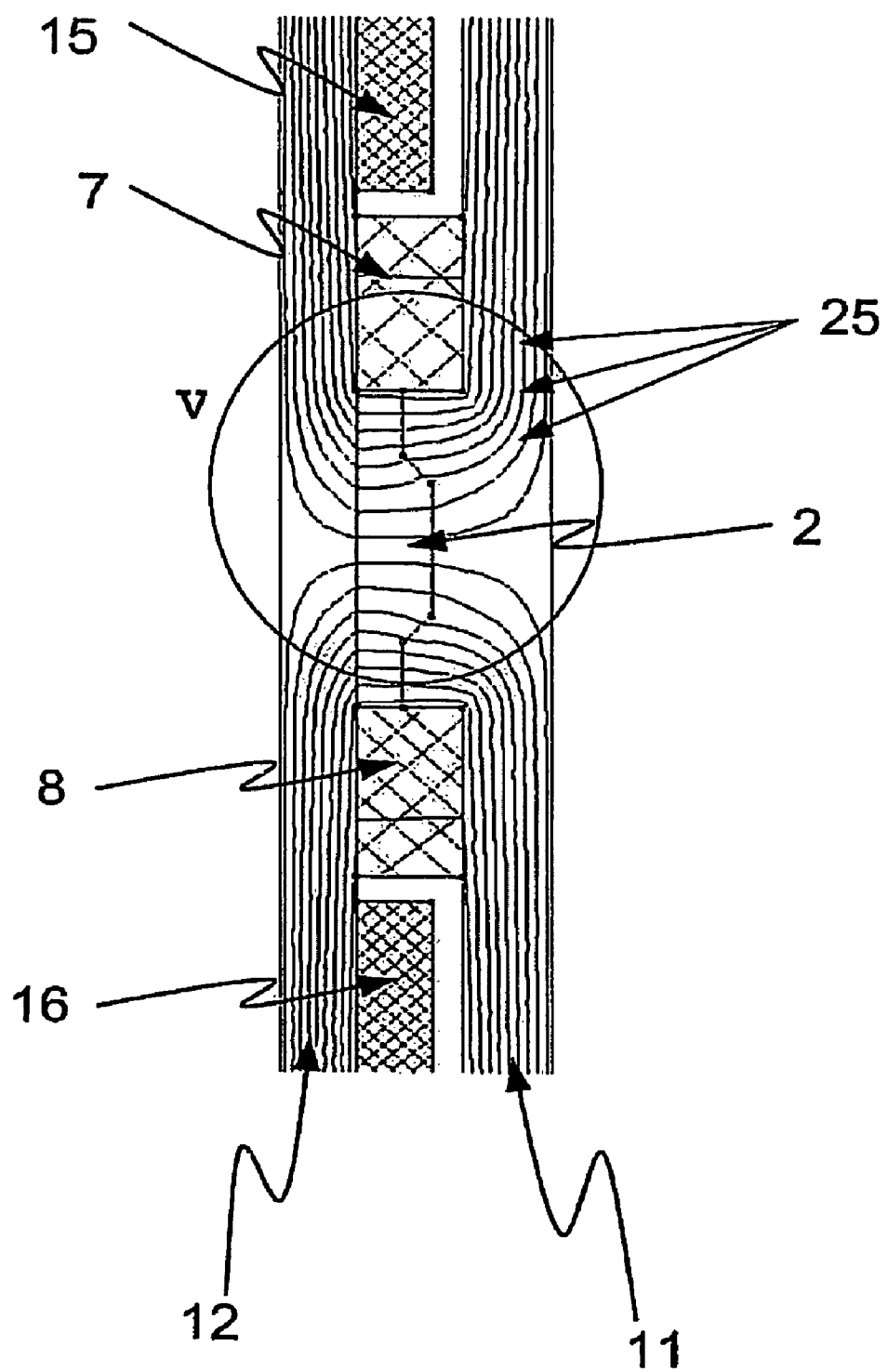
Figure 5:
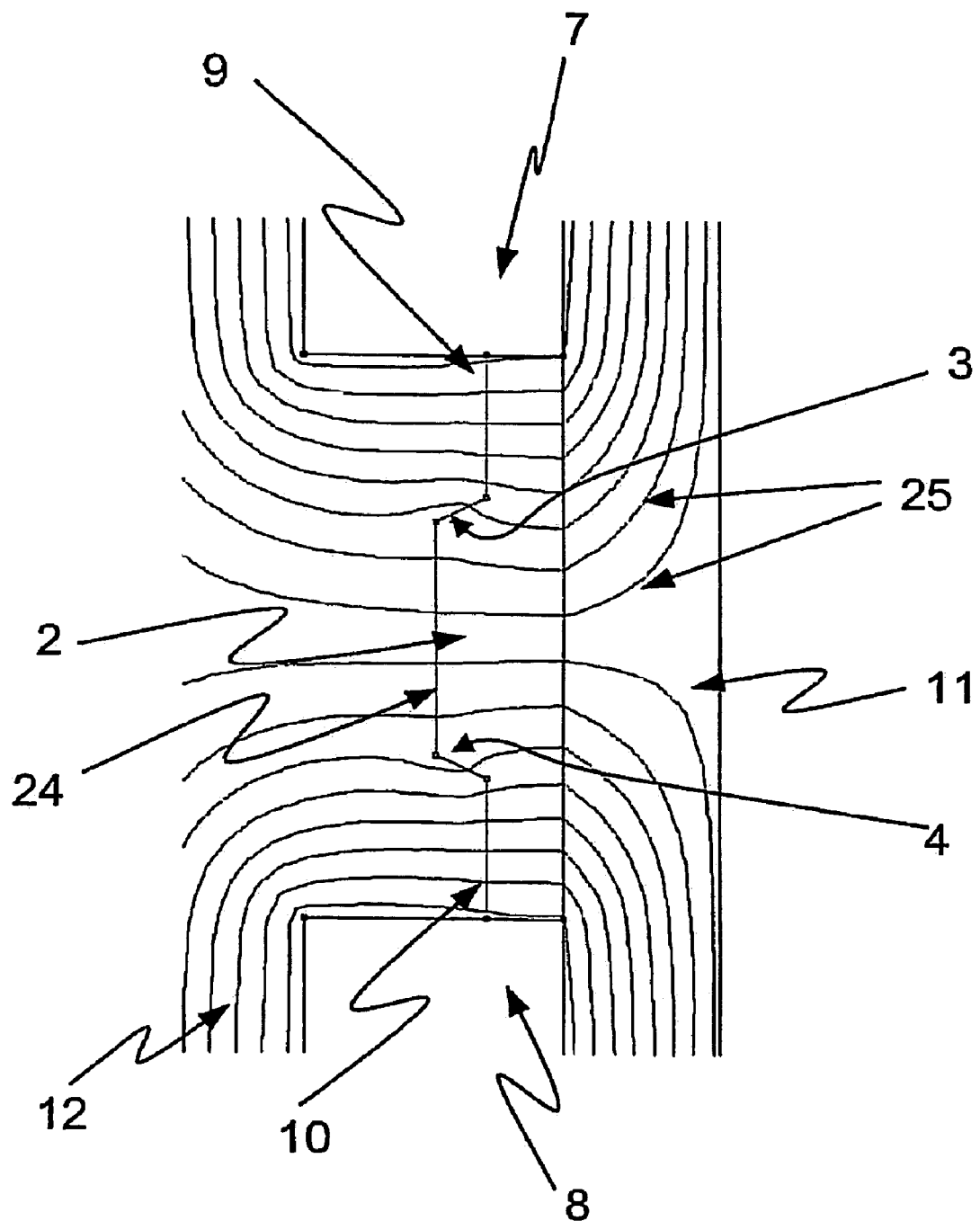
Figure 6:
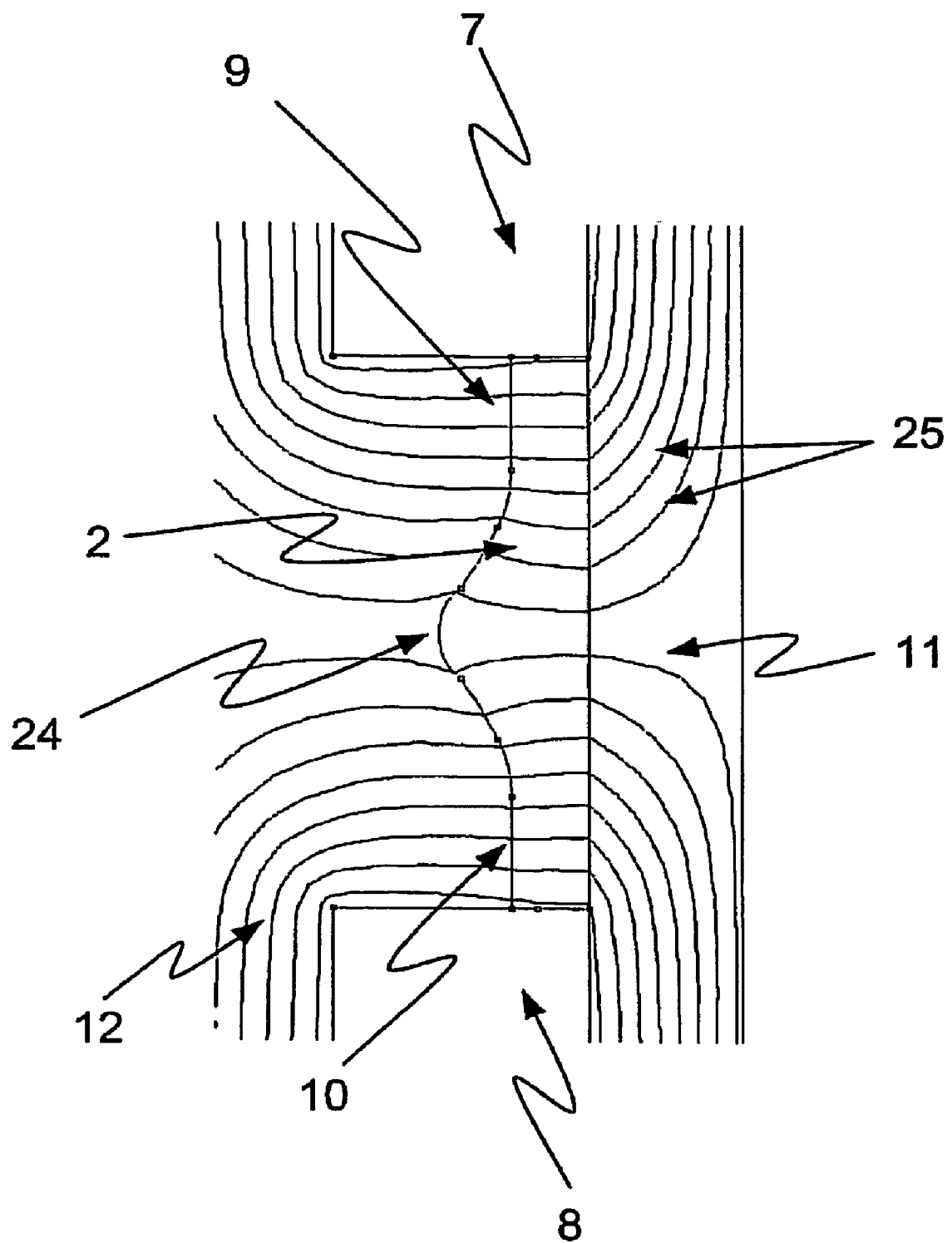
Figure 7:
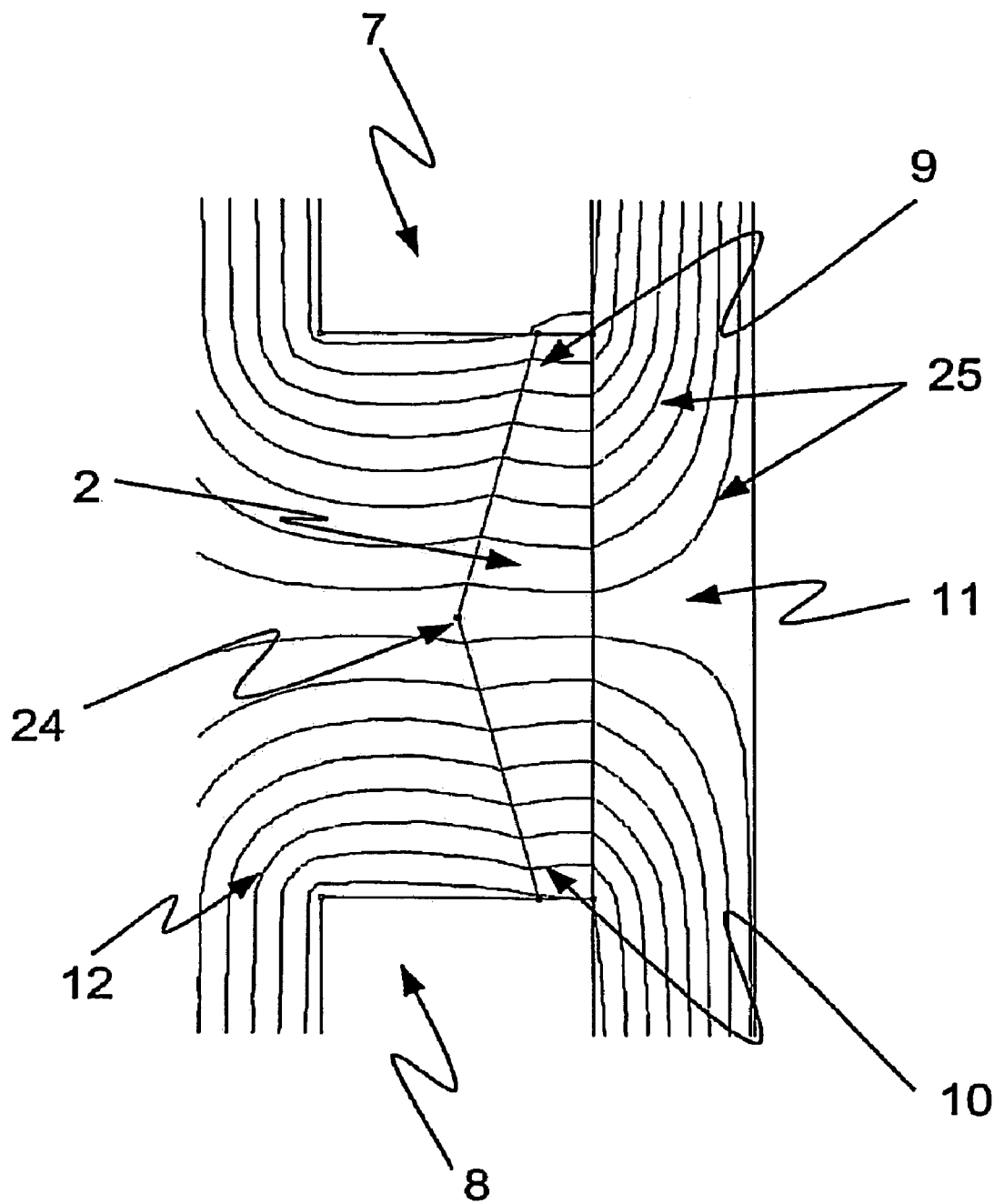
Figure 8:
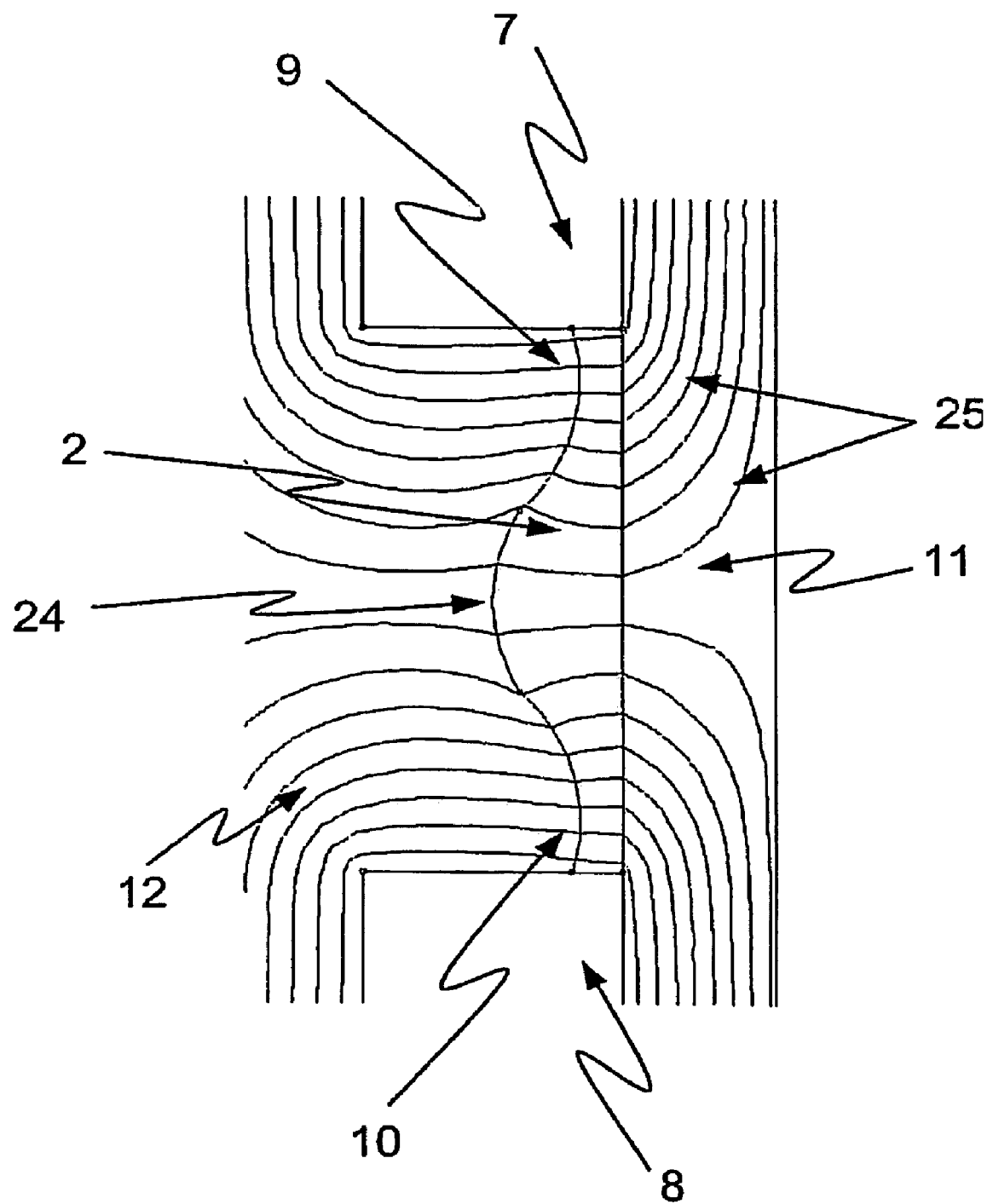

FIG. 1 shows in a perspective view an inner part of a controllable hydraulic bearing implemented as a bush bearing, FIG. 2 shows in a perspective view a partial assembly of two interposed sleeves, FIG. 3 is a cross-sectional view along the line III-III of FIG. 2, FIG. 4 is an enlarged view of a portion of the channel with indicated magnetic field lines, FIG. 5 shows the enlarged detail V of FIG. 4, FIG. 6 shows a section of a channel design which is different from the channel geometry depicted in FIG. 5, FIG. 7 is a detail of another variant of a channel geometry, and FIG. 8 illustrates another possibility for configuring a channel geometry.

DETAILED DESCRIPTION OF THE INVENTION

The inner part illustrated in FIG. 1 is part of a controllable hydraulic bearing according to the invention. This assembly has an elastomeric body 1 which is disposed around an inner part 17. The inner part 17 is then used for connecting the illustrated controllable hydraulic bearing implemented as a bush bearing with a suitable receiving member in a motor vehicle. In the illustrated variant of FIG. 1, two interposed sleeves 11 and 12 are arranged so as to intermesh and form a "multilayer structure." A coil pair consisting of the coils 13 and 14 is arranged in the outer surface 22 of the outer sleeve 12, wherein the coil 13 is located in the upper part of the bush bearing, in reference to the Figure, and the coil 14 in the lower part. The coils 13 and 14 are separated by the outer surface 22. A helical channel 2 is machined into the outer surface 22. The fluid flowing out of the first chamber of the hydraulic bearing, which is not visible in FIG. 1, after a corresponding force is applied on the hydraulic bushing, is routed via the opening 18 into the channel 2, from where the fluid column is moved through the additional opening 19 into the second chamber of the hydraulic bearing. The oscillations exerted on the hydraulic bearing are thereby compensated by the back and forth motion of the fluid column in channel 2, which equilibrates the pressure between the chambers.

The partial cross-section of FIG. 2 illustrates a sleeve combination implemented as a "multilayered structure." The interior components of the hydraulic bearing are not shown, so that the diagram of FIG. 2 represents a partial assembly. The partial assembly has, as mentioned before, two sleeves 11 and 12 which are interposed in a sandwich structure. The particular attribute of this embodiment is that each of the sleeves 11, 12 has in its respective upper and lower section a coil 13, 17 and 15, 16. The outer surface 22 of the sleeve 11, 12 is here at least partially implemented as a magnetic insulator 5, 6, 7, 8. The outer surface 22 also includes a channel system of channel 2. As seen from the diagram of FIG. 2, the outer sleeve 12 has an opening 20 and an additional opening 21, allowing connections between the channels. Such channel system provides a significant channel length. The openings 18 and 19 visible in the rear part of the inner sleeve 11 have already been discussed in conjunction with the embodiment depicted in FIG. 1. The channel 2 located in the outer surface 22 of sleeve 12 furthermore includes a deflection section 23, so that the channel 2 extends helically along the outer surface 22.

FIG. 3 shows in cross-section a detail of the sleeves 11, 12. In the embodiment depicted in FIG. 3, the outer sleeve 12 is also covered by an exterior sleeve 26. The schematically illustrated assembly can be later embedded into the elastomeric body during manufacture of the hydraulic bearing. The particularities of the diagram in FIG. 3 are that the channel 2 is interrupted or limited by magnetic insulators 5, 6, 7 and 8. The path of the magnetic field lines can be controlled by these magnetic insulators 5-8, so that an inhomogeneous magnetic field is produced inside the channel 2. The magnetic field is produced by coils 13, 14, 15 and 16, which are inserted in suitable recesses of the sleeves 11 and 12, as already discussed in conjunction with the diagram in FIG. 2. The sleeves 11 and 12 are preferably made of soft-magnetic iron for guiding the field. According to another feature of the solution of the invention, the electromagnet for generating the inhomogeneous magnetic field can be integrated directly in the hydraulic bearing of the invention and needs not be provided as an additional component.

To illustrate more clearly the spreading of the inhomogeneous magnetic field inside the channel 2, FIG. 4 shows an enlarged detail of the region about the channel 2 with the magnetic field lines 25. As discussed in more detail below in conjunction with the description of FIG. 5, when viewed in cross-section, the channel widens from a trapezoidal geometry to a rectangular geometry, wherein the sidewalls of channel 2 in the trapezoidal section are inclined. In the trapezoidal section the channel 2 widens toward the sleeve 12. Each of the coils 15 and 16 of the schematically illustrated sleeves 11 and 12 produces a magnetic field. The magnetic field lines run approximately parallel in the region of the sleeves 11 and 12, which are made of soft-magnetic iron. Insulators 7 and 8 are arranged in the marginal region of the channel 2, so that the magnetic field lines 25 can not exit at that point and extend around the insulators 7 and 8. In this way, the magnetic field lines 25 inside the channel 2 can be controlled. The magnetic field lines can then also be concentrated in the region of the channel 2. As also seen in FIG. 4, the magnetic field lines 25 always exit perpendicularly from the surface of the channel 2. By forming the channel geometry with inclined sidewalls, an inhomogeneous magnetic field with curved magnetic field lines is produced. A strong concentration of the potentially intersecting magnetic field lines 25 in the central region of the channel 2 can be prevented, which has proven to be a disadvantage with homogeneous magnetic fields.

FIG. 5 shows in an enlarged view a channel cross-section with a geometry that is designed similar to the channel already described in conjunction with FIG. 4. The trapezoidal section of the channel 2 widens toward the sleeve 11. The path of the magnetic field lines 25 inside the sleeves and the channel 2 can be clearly seen. The channel 2 has basically an approximately rectangular cross-section with a polygonal bulge that is preferably arranged in the center of the channel cross-section, as viewed in the axial direction of the hydraulic bearing, where the cross-sectional geometry has inclined sidewalls 3 and 4. The channel 2 includes a channel base 24 located between the inclined sidewalls 4, which in the exemplary embodiment is flat. The magnetic fields generated in the coils propagate inside the sleeves 11 and 12 as mutually parallel lines. They go around the magnetic insulators 7 and 8 disposed on the channel marginal region 9 and 10 and penetrate the channel 2 behind the insulators 7 and 8, so that the magnetic field lines exit perpendicularly in regions where the channels sections are straight. The regions with oblique or inclined sidewalls 3 and 4 of channel 2 cause the magnetic field lines 25, which also exit perpendicularly from the surface of the channel 2, to be curved compared to the other magnetic field lines. This changes the mutual spacing between the magnetic field lines 25, producing an inhomogeneous magnetic field with the useful properties according to the invention.

FIGS. 6 to 8 illustrate additional feasible cross-sectional geometries of the channel. FIG. 6 shows a channel design, where the channel base 24 has a depression. The magnetic field lines 25 exit perpendicularly from the surface of the channel 2 inside the channel geometry which is inclined toward the depression, thereby affecting the path of the magnetic field lines.

FIG. 7 shows a channel geometry with an approximately V-shaped cross-section. The channel base 24 is here also the lowest point of the channel 2. This channel design allows the magnetic field to be altered to produce an inhomogeneous magnetic field. As already discussed, the magnetic field lines 25 exit perpendicularly from the surface of the channel 2.

FIG. 8 finally shows an undulating shape of the channel 2. The channel base 24 represents here the lowest point of the channel 2. This design also produces the inhomogeneity of the magnetic field, as clearly illustrated by the curved magnetic field lines 25 shown in FIG. 8.

LIST OF REFERENCE SYMBOLS 1 elastomeric body
2 channel
3 sidewall of the channel
4 sidewall of the channel
5 magnetic insulator
6 magnetic insulator
7 magnetic insulator
8 magnetic insulator
9 channel marginal region
10 channel marginal region
11 sleeve
12 sleeve
13 coil
14 coil
15 coil
16 coil
17 inner part
18 through opening
19 through opening
20 through opening
21 through opening
22 outer surface
23 deflection section
24 channel base
25 magnetic field lines
26 external sleeve

The invention claimed is:

1. A controllable hydraulic bearing for damping vibrations in a defined frequency band, comprising
an elastomeric body (1),
two chambers filled with a magneto-rheological fluid and connected by at least one channel (2),
the two chambers having at least partially flexible chamber walls, wherein the chamber walls have a buckling spring rate representing a measure for a pressure change due to the volume displacement between the chambers,
at least one electromagnet generating a magnetic field in the region of the channel (2),
wherein the magnetic field in the region of the channel (2) is an inhomogeneous magnetic field.

2. The controllable hydraulic bearing according to claim 1, wherein the channel (2) has at least in sections inclined sidewalls (3, 4) and a paraboloidal or spheroidal cross-section.

3. The controllable hydraulic bearing according to claim 2, wherein the channel cross-section is changeable by controlling the current and thereby the generated magnetic field.

4. The controllable hydraulic bearing according to claim 3, wherein the current can be controlled as a function of an acceleration signal or of the pressure difference between the chamber pressures acquired as a measured value in the hydraulic bearing.

5. The controllable hydraulic bearing according to claim 1, wherein defined regions have a magnetic field concentration present in the channel (2).

6. The controllable hydraulic bearing according to claim 5, wherein the magnetic field concentration is influencable by magnetic insulators (5, 6, 7, 8) located in the marginal region (9, 10) of a channel and/or by the channel geometry.

7. The controllable hydraulic bearing according to claim 1, wherein the hydraulic bearing comprises at least one sleeve (11, 12) with the channel (2) disposed therein.

8. The controllable hydraulic bearing according to claim 1, wherein the hydraulic bearing comprises several sleeves (11, 12), and wherein the sleeves (11, 12) are interposed in a sandwich structure.

9. The controllable hydraulic bearing according to claim 7, wherein several sleeves (11, 12) are arranged concentrically with respect to one another.

10. The controllable hydraulic bearing according to claim 7, wherein the channel (2) is part of a channel system.

11. The controllable hydraulic bearing according to claim 7, wherein the channel (2) has an curved path along the outer surface of at least one of the sleeves (11, 12).

12. The controllable hydraulic bearing according to claim 7, wherein the channel (2) is placed in the outer surface of the respective inner sleeve (11, 12).

13. The controllable hydraulic bearing according to claim 7, wherein the channel (2) or the channel system are arranged in the hydraulic bearing so as to extend along one or several sleeves (11, 12).

14. The controllable hydraulic bearing according to claim 7, wherein at least one sleeve (11, 12) receives in its outer surface a coil (13, 14, 15, 16) or coil pairs of the electromagnet.

15. The controllable hydraulic bearing according to claim 7, wherein at least one sleeve (11, 12) is made of soft-magnetic iron so as to provide a return path for the magnetic field through the sleeve (11, 12).

16. The controllable hydraulic bearing according to claim 1, wherein the controllable hydraulic bearing is a bush bearing for motor vehicles.

17. The controllable hydraulic bearing according to claim 1, wherein the channel (2) has at least a paraboloidal or spheroidal cross-section.

18. The controllable hydraulic bearing according to claim 7, wherein several sleeves (11, 12) are arranged concentrically with respect to one another.

* * * * *